UNITED STATES PATENT OFFICE.

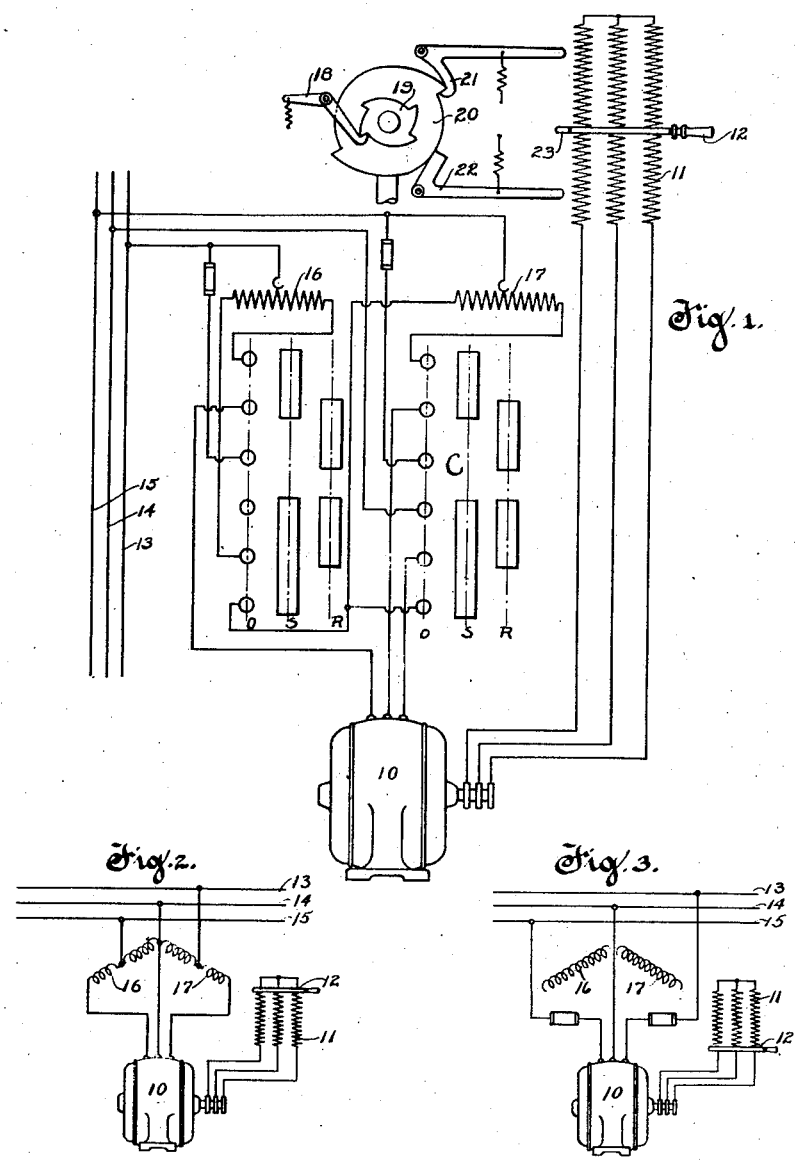

ALEXANDER M. GRAY, OF MILWAUKEE, WISCONSIN, ASSIGNOR TO ALLIS-CHALMERS COMPANY, A CORPORATION OF NEW JERSEY.

MOTOR-CONTROL SYSTEM.

1,027,415.   Specification of Letters Patent.   Patented May 28, 1912.

Application filed October 5, 1910. Serial No. 585,353.

*To all whom it may concern:*

Be it known that I, ALEXANDER M. GRAY, a subject of the King of England, residing at Milwaukee, in the county of Milwaukee and State of Wisconsin, have invented certain new and useful Improvements in Motor-Control Systems, of which the following is a full, clear, and exact specification.

My invention relates to the control of electric motors, and particularly of induction motors.

In the operation of alternating current motors, especially those of the induction type, it is desirable for many reasons to have a high power factor. In order to obtain this high power factor, it is necessary for the flux to be comparatively small so that the wattless current is but a small component of the total current in the motor. On the other hand, it is also desirable for certain purposes to have a large overload capacity. This is especially necessary during starting. However, a large overload capacity necessitates a comparatively heavy flux. Thus a large overload capacity and a high power factor require opposite conditions, and heretofore either has been obtained largely at the sacrifice of the other.

It is the object of my present invention to provide an arrangement, and to operate it by a method, whereby an alternating current motor, such as an induction motor, may be operated both with a high power factor and with a large overload capacity. This arrangement and this method, however, are not limited to induction motors. To accomplish this the motor is designed so that under normal conditions it operates with a high power factor; and when it is desired to operate the motor with a large overload capacity, the voltage impressed on its conductors is increased to bring the wattless component of the current up to a value necessary to produce a flux sufficient to give the overload capacity desired. In order to prevent this from causing too heavy a current in the secondary of the motor, if it be an induction motor, it is generally desirable that at the time such higher voltage is impressed on the motor a resistance be inserted in such secondary circuit. The control is preferably effected by supplying the motor under normal conditions directly from a supply circuit, and by connecting it to such circuit through a step-up transformer when the higher voltage is desired. However, there are other ways of doing it within the scope of my invention.

The various novel features of my invention will be apparent from the description and drawings, and will be particularly pointed out in the claims.

Figure 1 shows diagrammatically one arrangement for controlling an induction motor in accordance with my invention; and, Figs. 2 and 3 are simple connection diagrams showing the connections when the motor is operating with a large overload capacity and under normal running conditions respectively.

The motor 10 to be controlled is shown as a three phase, wound rotor, induction motor, in the secondary circuit of which is a variable resistance 11. In the drawings, a simple short-circuiting bar 12 is shown for obtaining this variation. The primary circuit of this motor may be connected to the mains 13—14—15 either directly or through step-up V-connected autotransformer windings 16 and 17. The primary connections are controlled by means of a controller C. When this controller C is in off position the motor and the auto-transformer windings are both entirely disconnected. When the controller C is in starting position the auto-transformer windings 16 and 17 are each connected between two of the motor leads, one of the motor leads, in Fig. 1 the right hand lead, being connected to one terminal of each winding. One of the mains, here 14, is connected to those two terminals of the auto-transformer winding which are connected in common to the right hand motor lead, and the other two mains are connected to intermediate points on the auto-transformer windings 16 and 17 respectively. The windings 16 and 17 thus constitute in effect a single V-connected auto-transformer, the main 14 and the right hand motor lead being connected to the middle of the V. When the controller C is in running position the auto-transformer windings 16 and 17 are connected directly to the three mains respectively. In the controller shown there is but one starting position between off and running positions, but it is obvious that any desired number of such starting positions may be employed.

The normal operation of the controller C is always in the same direction, a movement through 180° constituting a complete operation. If desired, a spring-pressed pawl 18, coöperating with a ratchet plate 19 mounted on the controller shaft, may be provided to prevent backward movement of the controller from off and running positions. The opposite halves of the controller drum are identical in structure, and each half coöperates in turn with each of two sets of contact fingers during successive operations of the controller, the sets of contact fingers being on opposite sides of the drum and arranged to co-act simultaneously with the two halves of the drum respectively.

The motor 10 is designed to operate with a high power factor; in other words, the magnetizing or wattless current required for this motor is small as compared with the total current. Because of this small wattless current the motor 10 under normal conditions has but a small overload capacity. For starting purposes, especially if the motor is loaded, a large overload capacity is required; or in other words, a larger wattless current is needed. To obtain this larger wattless current, the motor is connected at starting through the step-up transformer windings 16 and 17, which are so designed as to step up the voltage to a value sufficient to raise the current in the primary conductors of the motor 10 to such a value that the wattless component thereof, though still bearing the same proportion to the total current, is raised in absolute value to the desired figure. In order to prevent this from producing too large a current in the rotor windings, the secondary circuit of the motor has connected in its circuit at this time the entire resistance 11, and this resistance is gradually cut out as the motor speeds up.

The control of the motor is effected by moving the controller C from off to starting position with all the resistance 11 in circuit, thus impressing upon the motor a comparatively high voltage so that a numerically large wattless current and large flux are obtained; by cutting out the resistance 11 as the motor speeds up; and finally, when the resistance 11 has been entirely cut out, by moving the controller C to the running position to disconnect the auto-transformer windings and connect the motor 10 directly to the lower voltage of the circuit 13—14—15 so that the voltage impressed on the primary conductors of the motor is reduced.

If desired, the controller C and the resistance bar 12 may be operated by the same means or may be interlocked. In the arrangement shown, the shaft of the controller is provided with a ratchet plate 20 which coöperates with two dogs 21 and 22 spring-pressed to latching position, in which they stop the forward movement of the controller in off and starting positions respectively. The dogs 21 and 22 can be released through suitable mechanism, such as a finger 23, operated by the short-circuiting bar 12 of the resistance 11. This is arranged so that when the bar 12 is in position to cut in all the resistance 11 the dog 21 is released, and when in position to cut out all the resistance 11 the dog 22 is released. By this means the controller C is prevented from moving from off to starting position unless all the resistance 11 is in circuit, and is prevented from moving from starting to running position until the resistance 11 has been cut out of circuit. It may be moved at any time from running position to off position. Sometimes it may be desirable to omit the dog 22.

The arrangement shown is merely illustrative, and is capable of many modifications without involving a departure from the spirit and scope of my invention. All such modifications I aim to cover in the following claims.

What I claim as new is:

1. The method of starting an induction motor, which consists in impressing upon its primary conductors a high voltage while the resistance in the secondary circuit thereof is high, and reducing both the resistance of said secondary circuit and the voltage impressed on the primary conductors.

2. The method of starting an induction motor, which consists in impressing upon its primary winding a high voltage while the resistance of the secondary circuit thereof is high, reducing the resistance of the secondary circuit, and then reducing the voltage impressed on the motor.

3. In combination, a wound rotor induction motor, a variable resistance for the secondary circuit thereof, means for varying said resistance, a supply circuit, a step-up transformer, and means for connecting said motor to the supply circuit either directly for obtaining the voltage of the supply circuit or through the transformer for obtaining a voltage higher than that of the supply circuit.

4. In combination, a wound rotor induction motor, a variable resistance for the secondary circuit thereof, a supply circuit, a step-up transformer, means for connecting said motor to the supply circuit either directly or through the transformer, and means for preventing the connection of the motor through said step-up transformer save when said variable resistance is at a maximum.

5. In combination, a wound rotor induction motor, a variable resistance for the secondary circuit thereof, a supply circuit, a step-up transformer, means for connecting said motor to the supply circuit either directly or through the transformer, and means for preventing the motor from being changed from the connection through the step-up transformer to the direct connection save when the variable resistance is at a minimum.

In testimony whereof I affix my signature in the presence of two witnesses.

ALEXANDER M. GRAY.

Witnesses:
 CHAS. L. BYRON,
 LAURA HUENNEKENS.